May 9, 1939.  H. THÜRLINGS  2,157,467

MACHINE FOR MOLDING AND EMBOSSING SWEETS

Filed March 17, 1938  2 Sheets-Sheet 1

Inventor,
H. Thürlings
By Glascock Downing & Seebold
Attys.

May 9, 1939. H. THÜRLINGS 2,157,467
MACHINE FOR MOLDING AND EMBOSSING SWEETS
Filed March 17, 1938 2 Sheets-Sheet 2

Inventor,
H. Thürlings
By Glascock Downing & Seebold
Attys.

Patented May 9, 1939

2,157,467

UNITED STATES PATENT OFFICE 2,157,467

MACHINE FOR MOLDING AND EMBOSSING SWEETS

Hermann Thürlings, Viersen, Germany, assignor to Hansella Albert Henkel K. G., Viersen, Germany Application March 17, 1938, Serial No. 196,488
In Germany March 20, 1937

6 Claims. (Cl. 107—15)

This invention relates to machines for forming sweetmeats such as tablets or drops in which a string or rope of plastic sugar is fed into an endless train of travelling molds whereby it is severed into pieces, and in which embossing elements are associated with the molds and are moved axially to emboss or form the pieces into drops or tablets.

With machines of this nature it is usual for the sweets to be discharged from the train of molds (where the latter open) still hanging together by their fins in chain formation. For various reasons known in the art it is preferred that the drops should be discharged from the molding machine separately.

Machines are known adapted more particularly for the manufacture of tablets without fins at their edges in which the tablets are delivered separately at the discharge, but these machines, however, are not suitable for the manufacture of high-class filled embossed sweets.

It is an object of the present invention to provide an improved machine whereby filled embossed sweets may be molded and embossed in a highly satisfactory manner such that they are discharged separately from the machine.

To this end the embossing elements are arranged so that the embossing positions of the embossers in adjacent molds are staggered, whereby adjacent pieces of plastic sugar will be severed by the embossing elements at the position where they assume the staggered relation. The staggering of the embossing elements may be effected by providing alternate elements with short and long shafts. Alternatively the embossing heads of adjacent elements may be long and short.

In the accompanying drawings which illustrate diagrammatically a sweet molding and embossing machine according to the invention:

Figure 1:
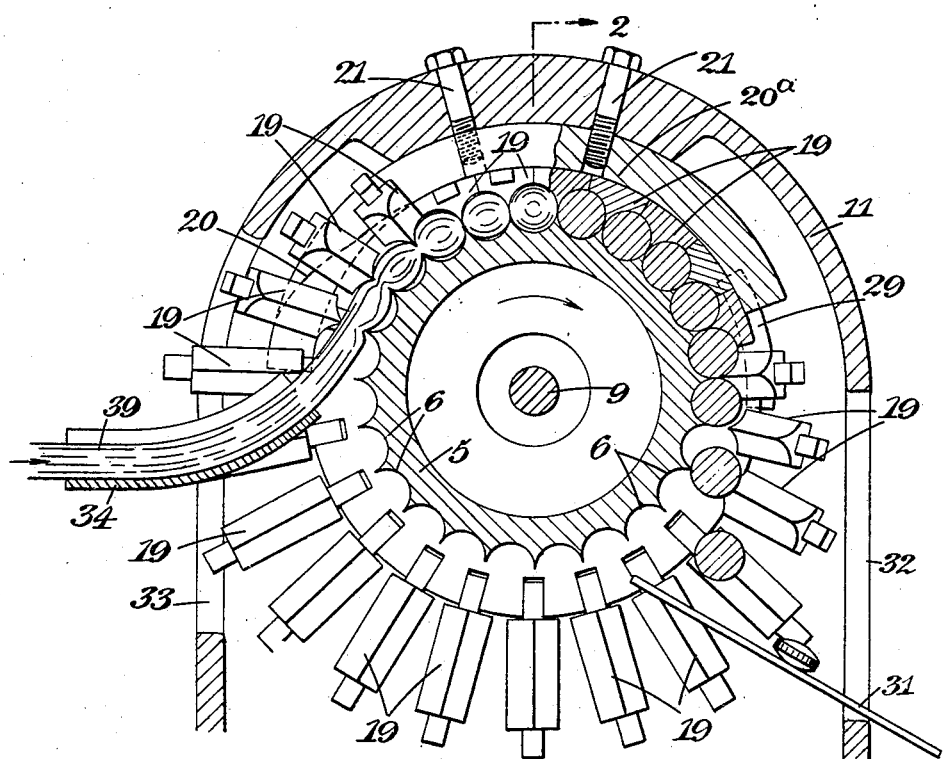
Figure 1 is a cross-sectional elevation taken on the line 1—1 of Figure 2.

In carrying the invention into effect according to one convenient mode, the molding and embossing machine comprises a rotary mold device having an inner mold part 5 formed with a series of half molds 6. This inner mold part is mounted between discs 7 and 8 which are carried upon the shaft 9 mounted in bearings 10 in the frame 11 of the machine. The disc 7 is provided with an axial sleeve portion 12 and flanges 13 and 14, the flange 14 being provided with or formed as a gear 15 which meshes with a pinion (not shown) by which the molds are rotated. The disc 8 is also provided with a sleeve 16 and flange portions 17 and 18.

Pivotally carried by the flange 13 is a series of outer mold elements 19 which are adapted to co-operate with the inner mold part 5 to form complete mold apertures. The movable mold elements 19 also provide cutting devices by which the rope of plastic sugar indicated by the reference 39 is severed into suitable pieces as the mold elements 19 are moved to their closed position. The closing of the mold elements 19 is effected by their engagement with a stationary cam surface 20 during the rotation of the mold parts.

When the pivoted outer mold elements 19 are fully closed they are retained in this position by a portion 20a of the cam 20, such portion being concentric with the axis of revolution. The cam 20, 20a is secured to the frame or casing by means of bolts 21.

Co-operating with the molds is a series of plunger or embossing elements 22, two of these elements being provided for each mold aperture. The embossers are mounted upon rods 23 which are guided in apertures in the flanges 13, 14 and 17, 18 respectively. On the outer end of these rods heads 24 are provided which are adapted to engage stationary cams 25, 26 arranged at either side of the machine and secured to the frame by bolts 27. These cams are adapted to cause the embossing plungers to move inwardly in the mold apertures whereby the sweets are shaped and embossed in the desired manner.

Figure 3:
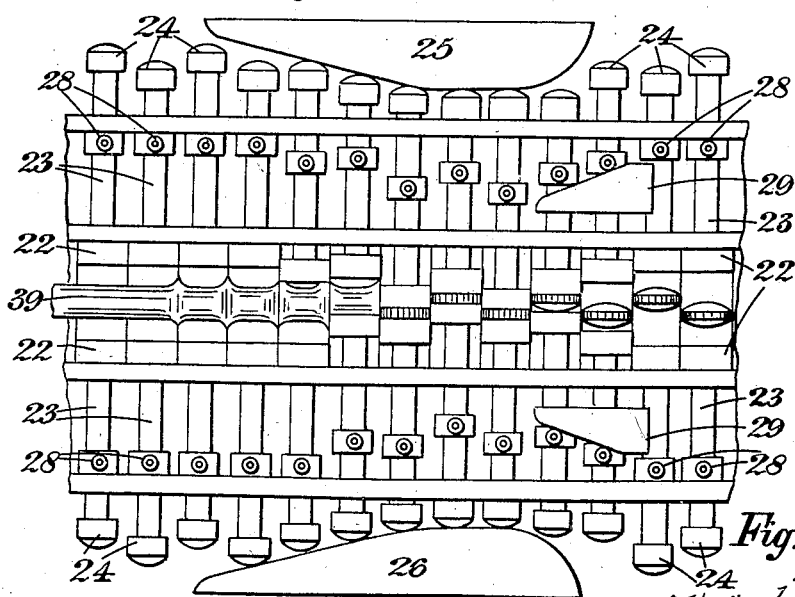
Figure 3 is a developed plan corresponding to the machine shown in Figures 1 and 2 showing a sufficient number of adjacent molds to cover the complete operation of feeding the rope of plastic sugar to the molds and the discharge of the embossed sweets.
Figure 2:
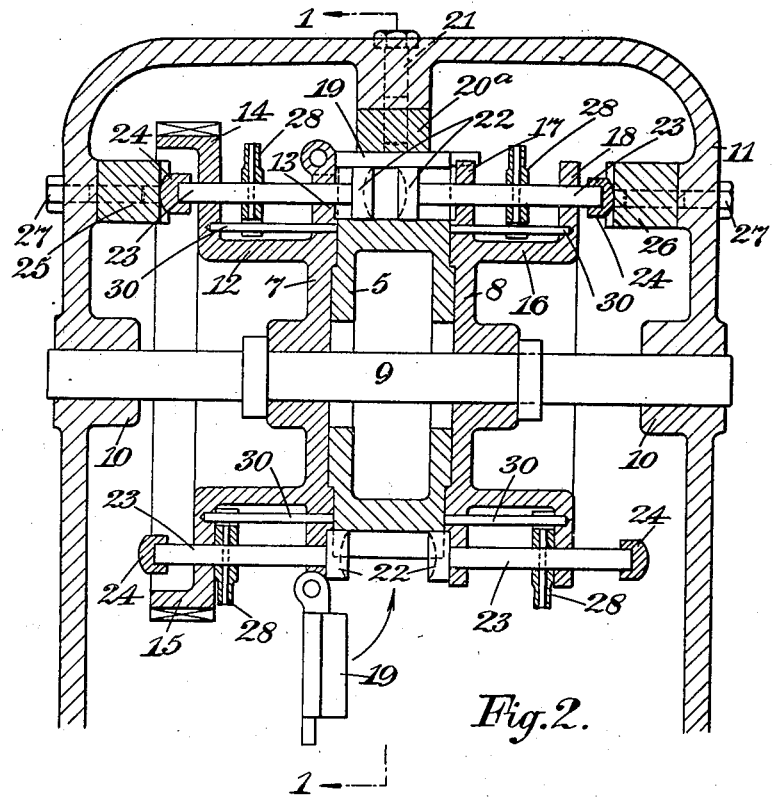
Figure 2 is a longitudinal section taken on the line 2—2 of Figure 1.

In order that adjacent sweets shall be separated from one another the embossing elements when in their final embossing position are adapted to be staggered, as will be seen in Figure 3, so that the embossing heads act to sever the fins between adjacent sweets. For the purpose of staggering the embossers the rods 23 of adjacent embossing elements are alternately short and long, it being appreciated that in one pair of elements the rod on one side of the machine will be a long rod while the corresponding rod of the pair will be a short one, as will be clearly observed from the developed plan.

In order to move the embossers outwardly after the embossing operation, each embosser rod 23 is provided with a projection 28 which is adapted to engage a stationary cam 29 as the train of molds rotates, there being a cam at each side of the machine. These projections extend outwardly while at their inner ends they are guided by rods 30 carried in the flanges 13, 14 and 17, 18.

After the embossing has been completed the pivoted outer mold parts 19 are adapted to be opened as indicated in the right hand half of Figure 1, such opening being by gravity or positively by the engagement of the parts 19 with a stationary cam, whereby the tablets or drops are allowed to fall from the molds on to a guide plate or chute 31 extending through an aperture 32 in the framing 11 of the machine. The tablets will fall freely of one another owing to the absence of fins due to the staggered embossing action.

The rope of plastic sugar 39 is guided into the molds through an aperture 33 in the framing of the machine and is suitably supported by a guide 34.

Figure 4:
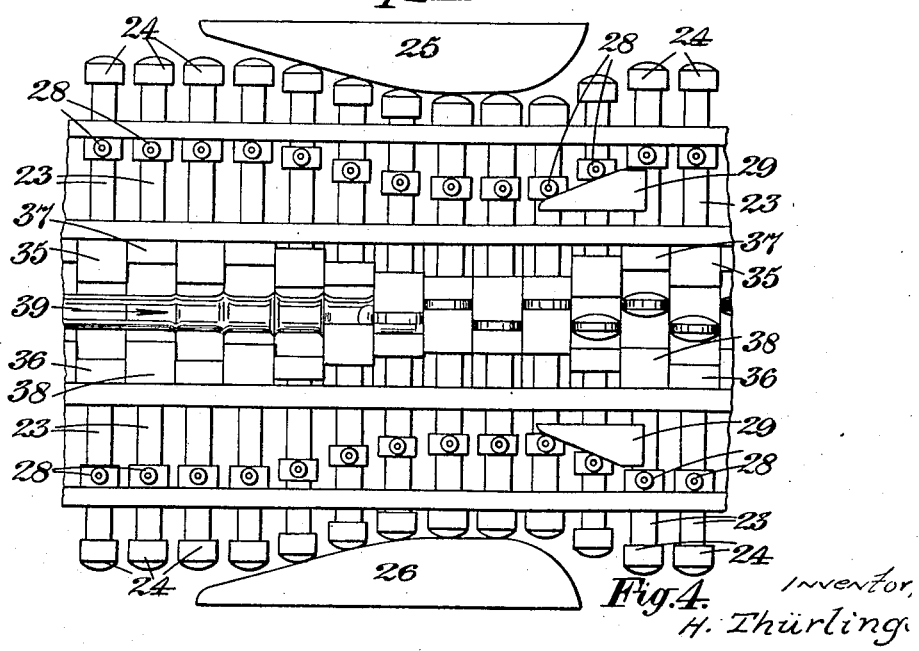
Figure 4 is a similar developed plan illustrating a modified form of the invention.

According to a modified form (see Figure 4) the staggering of the embossing positions of the embossing plungers is effected by providing embossing heads 35, 36 of different depth. Thus in one pair of co-operating embossers the head 35 is deeper than the head 36, while in the adjacent pair the position is reversed, the head 37 being shallow while the head 38 is deeper. In this form the rods 23 of the embossers are all of the same length.

I claim:

1. A machine for molding sweets in tablet or drop form from a rope of plastic sugar confectionery, comprising an endless train of molds adapted to sever pieces from said rope, means for moving said molds through a circuit, pairs of co-operating embossing elements in each of said molds, means for moving the embossing elements towards one another to mold and emboss the pieces, and means for moving adjacent pairs of embossing elements into embossing positions which are staggered relatively to one another and for retaining said elements in said staggered positions until the molds are opened to release the tablets whereby adjacent tablets or drops are severed from one another and are discharged singly from the machine.

2. A machine as claimed in claim 1 wherein the embossing elements are mounted upon rods, stationary cams for moving the embossing elements axially, the rods of adjacent embossing elements being alternately long and short to provide said staggering.

3. A machine as claimed in claim 1 wherein the embossing elements comprise embossing heads mounted upon rods, stationary cams for moving the embossing elements axially, the embossing heads of adjacent elements being alternately deep and shallow to provide said staggering.

4. A machine for molding sweets in tablet or drop form from a rope of plastic sugar confectionery, comprising a rotary mold device having an inner mold part comprising a contiguous series of mold recesses, a series of co-operating dividing mold elements displaceably mounted with respect to the inner mold part, cam means for closing the dividing mold elements on to the inner mold part to form a series of mold apertures, pairs of co-operating embossing elements located in said mold apertures, cams for moving the embossing elements parallel to the axis of revolution of the rotary mold to and from the embossing positions, the movements of the embossing elements being such that the embossing positions of adjacent pairs of elements are relatively staggered and that the embossing elements remain in staggered position until they are opened to release the tablets.

5. A machine as claimed in claim 4 wherein the embossing elements are carried by alternately long and short rods whereby said staggering is attained.

6. A machine as claimed in claim 4 wherein adjacent embossing elements are formed with alternately deep and shallow heads, whereby said staggering is attained.

HERMANN THÜRLINGS.